(12) United States Patent
Kubota et al.

(10) Patent No.: US 7,991,900 B2
(45) Date of Patent: Aug. 2, 2011

(54) IMAGE DISPLAY DEVICE, STORAGE DEVICE, IMAGE DISPLAY SYSTEM AND NETWORK SETUP METHOD

(75) Inventors: Mitsuru Kubota, Matsumoto (JP); Toru Karasawa, Matsumoto (JP); Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 271 days.

(21) Appl. No.: 12/349,387

(22) Filed: Jan. 6, 2009

(65) Prior Publication Data

US 2010/0005150 A1  Jan. 7, 2010

(30) Foreign Application Priority Data

Jan. 17, 2008  (JP) .................................. 2008-008398
Dec. 1, 2008   (JP) .................................. 2008-306497

(51) Int. Cl.
    *G06F 13/00* (2006.01)
(52) U.S. Cl. .......................... 709/228; 709/225; 709/250
(58) Field of Classification Search .................. 709/217, 709/219, 223, 225, 227, 228, 250
    See application file for complete search history.

(56) References Cited

U.S. PATENT DOCUMENTS

| | | | |
|---|---|---|---|
| 7,486,946 B2 | 2/2009 | Shniozaki | |
| 7,555,602 B2 | 6/2009 | Utsumi | |
| 7,580,701 B2 * | 8/2009 | Ross et al. | 455/411 |
| 2005/0262223 A1 * | 11/2005 | Kimura | 709/220 |
| 2006/0067295 A1 * | 3/2006 | Lehotsky et al. | 370/351 |
| 2007/0291946 A1 | 12/2007 | Ohtsu et al. | |
| 2008/0005335 A1 * | 1/2008 | Yun | 709/227 |

FOREIGN PATENT DOCUMENTS

| | | |
|---|---|---|
| JP | 2005-184314 A | 7/2005 |
| JP | 2005-218035 A | 8/2005 |
| JP | 2006-186676 A | 7/2006 |
| JP | 2006-227797 A | 8/2006 |
| JP | 2006-293787 A | 10/2006 |
| JP | 2007-080246 A | 3/2007 |
| JP | 2008-004978 A | 1/2008 |

\* cited by examiner

*Primary Examiner* — Viet Vu
(74) *Attorney, Agent, or Firm* — AdvantEdge Law Group, LLC

(57) ABSTRACT

An image display system 20 includes a projector PR1, a computer PC1 and a USB memory U1 which can be connected in an ad-hoc mode by using a wireless LAN. When a user connects the USB memory U1 to a USB interface 75 of the projector PR1, the projector PR1 writes network setup information in a setup information storage area 144 of the USB memory U1. Then, when the user removes the USB memory U1 from the USB interface 75 and connects it to a USB interface 125 of the computer PC1, the computer PC1 performs network setup by referring to the network setup information and establishes connection to start projection by an automatic start program.

15 Claims, 11 Drawing Sheets

FIG. 9A  SETUP OF WIRED LAN

FILE NAME : ManualStart
    IP=192.168.10.2
    PJNAME=EMP2624A8
    MAC=66:77:88:99:AA:BB

FIG. 9B  SETUP OF WIRELESS LAN

FILE NAME : FastStart
    SSID=EP*SON
    PJNAME=EMP2624A8
    MAC=11:22:33:44:55:66

IMAGE DISPLAY DEVICE, STORAGE DEVICE, IMAGE DISPLAY SYSTEM AND NETWORK SETUP METHOD

CROSS REFERENCE TO RELATED APPLICATIONS

The present application claims priority from Japanese Patent Application No. 2008-008398 filed on Jan. 17, 2008, and No. 2008-306497 filed on Dec. 1, 2008, which is hereby incorporated by reference in its entirety.

BACKGROUND

In recent years, various network-type image display systems have been developed with popularization of network technologies. For example, in a network-type projector system, images can be projected by transmitting image data to an arbitrary projector from another arbitrary device connected to a network, for example, from a terminal.

In the network-type image display system, the setup of network information and connecting operations of devices are complicated, which were difficult operations particularly for entry-level users. Accordingly, as a method of reducing difficulty of these operations, for example, a technique is disclosed (refer to Japanese Publication No. JP-A-2005-184314), in which a wireless LAN card for the terminal is inserted into a slot of a wireless access point to thereby register a MAC address of the wireless LAN card in the access point information such as an SSID is written in the wireless LAN card, and the wireless LAN card is inserted into a slot of a terminal to thereby perform network setup between the access point and the terminal easily. As another example, a configuration is disclosed (refer to Japanese Publication No. JP-2006-227797), in which a communication device having communication functions is attached to a data projector to thereby read setup of communication of the data projector, and the communication device is re-connected to a computer to enable transmission of images from the computer to the data projector.

However, in the above techniques, devices having communication functions such as the wireless LAN card and the communication device are used, therefore, general versatility is low. Additionally, a problem that functions overlap when the computer itself has communication functions has been pointed out.

SUMMARY

In view of the above, an object to be achieved by the invention is to perform network connection simply while considering general versatility of devices.

The invention has been made for solving at least part of the above problems, which can be realized as the following embodiments or application examples.

APPLICATION EXAMPLE 1

An image display device which can be connected to a network includes a network connection unit performing communication through the network, a USB connection unit to which a USB memory is connected, a writing unit writing setup information necessary for setup of communication with the image display device through the network in the USB memory connected to the USB connection unit so as to be readable from another device which is different from the image display device and a display unit displaying images by receiving given image data from the another device which is allowed to perform communication through the network by reading the setup information and performing setup concerning the network when the USB memory removed from the image display device is connected to the another device after the setup information is written.

The image display device having the above configuration writes setup information necessary for setup of communication with the image display device through the network so that the information can be read from another device which is different from the image display device when the USB memory is connected to the USB connection unit. Therefore, when the storage medium is connected to another device, for example, a terminal, which can be connected to the network, and setup of another device concerning the network by using the written setup information is performed, it is possible to perform communication between another device and the image display device through the network and to display images based on image data received from another device.

APPLICATION EXAMPLE 2

The image display device according to Application Example 1, further includes a determination unit determining whether the connected USB memory is a dedicated storage medium in which setup information concerning the network is written, and the writing unit writes the setup information when the determination unit determines that the connected USB memory is the dedicated storage medium.

The image display device having the above configuration writes setup information when the connected USB memory is a dedicated storage medium for writing setup information used for network setup, therefore, it is prevented that setup information is accidentally written when a USB memory and the like storing image data and the like to be displayed by the image display device is connected. Here, whether the memory is the dedicated storage medium for writing setup information or not can be determined by various methods, for example, a method of Application Example 3.

APPLICATION EXAMPLE 3

In the image display device according to Application Example 2, the determination unit makes determination based on a folder configuration or a file configuration stored in a storage area included in the USB memory or identification information stored in the USB memory.

The image display device having the above configuration determines whether the connected USB memory is a dedicated USB memory used for setup of the network or not based on the folder configuration, the file configuration (including existence of a specific file) and identification information included in the USB memory, therefore, it is possible to make determination simply and positively. As another method, a method of making determination based on a volume configuration, whether a specific name is added to the USB memory and the like can be applied.

APPLICATION EXAMPLE 4

The image display device according to Application Example 2 further includes a program writing unit writing a program in the USB memory when the USB memory does not include the program for reading the setup information by the another device from the USB memory.

The above image display device writes the program in the USB memory when the program of reading setup information by another device from the USB memory is not included. Therefore, it is possible to allow another device to perform appropriate operation even when the necessary program is not included in the USB memory.

APPLICATION EXAMPLE 5

In the image display device according to Application Example 3, the program writing unit is a unit writing the program so as to be automatically executed when the USB memory is connected to the another display device.

According to the above image display device, it is possible to write the necessary program in the USB memory so as to be automatically executed and to increase convenience when the USB memory is connected to another device. As methods of enabling the automatic execution, methods such as an autorun function of MS-DOS system OS and a start item designation of Macintosh (trademark) system OS can be used.

APPLICATION EXAMPLE 6

The image display device according to any of Application Examples 1 to 5 further includes a detection unit detecting types of available networks when the USB memory is connected to the USB connection unit, in which the writing unit writes the setup information corresponding to a type of network to be preferentially used based on a detection result by the detection unit.

The image display device having the above configuration detects types of available networks and writes setup information corresponding to the type of network which is preferentially used based on the detection. Therefore, even when there are plural types of available networks, it is possible to write accurate setup information in the USB memory based on the order of priority. The determination of priority use can be made by, for example, storing the order of priority in a setup file in advance and referring to the setup file.

APPLICATION EXAMPLE 7

In the types of networks, a wireless-LAN type and a wired-LAN type can be included. Therefore, the image display device can write setup information of the wireless LAN and the wired LAN in the USB memory based on the order of priority.

APPLICATION EXAMPLE 8

In the image display device according to Application Example 7, when the image display device includes setup information concerning the wireless LAN and the wired LAN, the writing unit can write both setup information in the USB memory. Both setup information is written, thereby taking action when either LAN is used.

APPLICATION EXAMPLE 9

In the image display device according to any of Application Examples 1 to 8, the image display device is a network-type projector, and the display unit is a unit projecting images on a given projection screen.

The above image display device can be realized as a network-type projector. It can be realized also as a network-type monitor or TV. As another device, various devices such as a computer, a handy terminal, a digital camera, a digital video camera, a cellular phone and the like can be used through Application 1 to Application 9. This is the same as in the following configurations.

APPLICATION EXAMPLE 10

A USB memory connected to a USB which is a general-purpose data bus includes a unit storing setup information in a prescribed area, which is necessary for setup of communication with an image display device through a network, when connected to the image display device connected to the network and performing image display, a unit automatically starting a first program stored in advance when connected to another device which makes the image display device display images and a unit executing a second program in the another device, which makes the image display device display images from the another device, after performing setup concerning the network in the another device so that the another device can be connected to the image display device by using the setup information stored in the storage area by the first program.

The USB memory having the above configuration starts the first program performing setup concerning the network and the second program making the image display device display images. Therefore, it is possible to perform network setup and image display simply without troubling the user.

APPLICATION EXAMPLE 11

In the USB memory according to Application Example 10, the first program includes a program of determining whether the second program is installed in the another device, and when the second program is not installed, allowing the another device to carry out functions of executing installation of the second program and starting the installed second program.

The USB memory having the configuration performs installation when the second program is not installed in another device to realize the function of the second program. Therefore, even when an image is displayed by the image display device by using another device for the first time, or when it is impossible to execute the second program on the USB memory directly, it is possible to perform network setup and image display simply without troubling the user.

The invention can be also realized as an image display system shown in Application Example 12 and a network connection method shown in Application Example 15.

APPLICATION EXAMPLE 12

An image display system includes an image display device connected to a network, another device which is different from the image display device and a USB memory including prescribed identification information, in which the image display device has a network connection unit connecting to a network so that communication is possible, a USB connection unit to which the USB memory is connected so as to be detachable, a writing unit writing setup information which is necessary for setup of communication with the image display device through the network when it is determined that the USB memory connected to the USB connection unit has the prescribed identification information, and a display unit displaying images by receiving given image data from the another device, and in which the another device has a general-purpose USB connection unit to which a general-purpose USB memory can be connected, a network setup unit performing setup for enabling communication with the image display device through the network by using the setup information stored in the USB memory when the USB memory in which the setup information is written is connected to the general-purpose USB connection unit, and a transmission unit transmitting the given image data to the image display device through the network the setup of which is performed.

In the above image display system, the following application examples can be considered.

APPLICATION EXAMPLE 13

In the image display system according to Application Example 12, the USB memory includes a unit executing a prescribed program in the another device when the USB memory is connected to the another device, determining whether there exists a program realizing the network setup unit in the another device and installing the program from the USB memory so as to be executed in the another device when there does not exist the program.

APPLICATION EXAMPLE 14

In the image display system according to Application Example 12 or 13, the transmission unit in the another device captures an image displayed on a display unit included in the another device at a predetermined interval and transmits the captured images to the image display device.

APPLICATION EXAMPLE 15

A network setup method performing setup of communication between an image display device connected to a network and another device which is different from the image display device includes the steps of connecting a USB memory having prescribed identification information to a USB port of the image display device, storing setup information necessary for setup of communication with the image display device through the network in the USB memory when the USB memory connected to the USB port includes the identification information and performing setup processing to enable communication between the another device and the image display device through the network by performing setup in the another device, which uses the setup information stored in the USB memory when the USB memory storing the setup information is connected to the another device.

APPLICATION EXAMPLE 16

The network setup method according to Application Example 15 further includes the steps of determining whether there exists a program performing the setup processing in the another device when the USB memory is connected to the another device and installing the program in the another device when it is determined that the program does not exist.

BRIEF DESCRIPTION OF THE DRAWINGS

Non-limiting and non-exhaustive embodiments of the present disclosure will be described with reference to the accompanying drawings, wherein like reference numbers reference like elements.

FIG. 9 is an explanatory view showing an example of setup information to be written in a USB memory U3 in the second embodiment.

DESCRIPTION OF EMBODIMENTS

First Embodiment

A first embodiment of the invention will be explained.
A. Configuration of Image Display System
A1. Schematic Configuration of Image Display System 20

Figure 1:
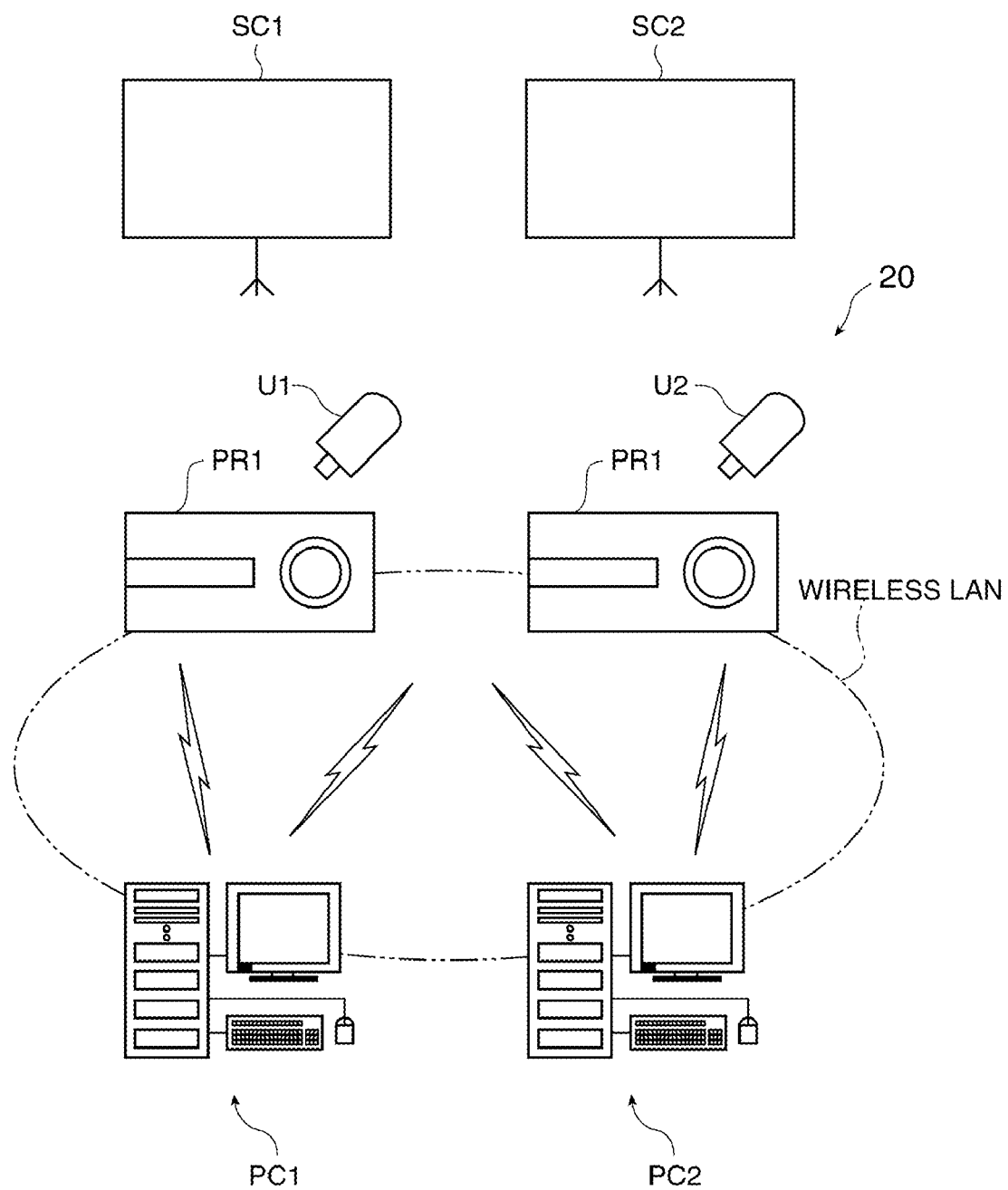
FIG. 1 is an explanatory view showing a schematic configuration of an image display system 20 according to an embodiment.

A configuration of an image display system 20 according to the embodiment will be shown in FIG. 1. The image display system 20 is an image display system capable of displaying given images by using a network-type projector, which is configured by connecting computers PC1, PC3 as other devices (which function as terminals with respect to projectors PR1, PR2) and projectors PR1, PR2 as image display devices by a prescribed network. In the embodiment, the computers PC1, PC2 and the projectors PR1, PR2 are connected by a wireless LAN respectively, and communication is possible in an ad-hoc mode, not through an access point.

The projector PR1 or PR2 establishes connection with the computer PC1 or the computer PC2, which can receive image data and display images on screens SC1, SC2. Additionally, USB memories U1, U2 which are used for network setup are respectively attached to the projectors PR1, PR2. Specific usage of the USB memories U1, U2 will be described later.

The communication method between the computers PC1, PC2 and the projectors PR1, PR2 are not limited to the above form and various methods can be set up according to use environment, required communication speed and the like. For example, the computers PC1, PC2 may communicate with the projectors PR1, PR2 in the infrastructure mode through an access point. It is also preferable to perform communication in wired methods and the like, not limited to wireless methods, which use, for example, Ethernet (registered trademark), FireWire (registered trademark), Fibre Channel, SCSI, Bluetooth (registered trademark), PLC (Power Line Communications) and the like.

A-2. Schematic Configuration of Projector PR1

Figure 2:
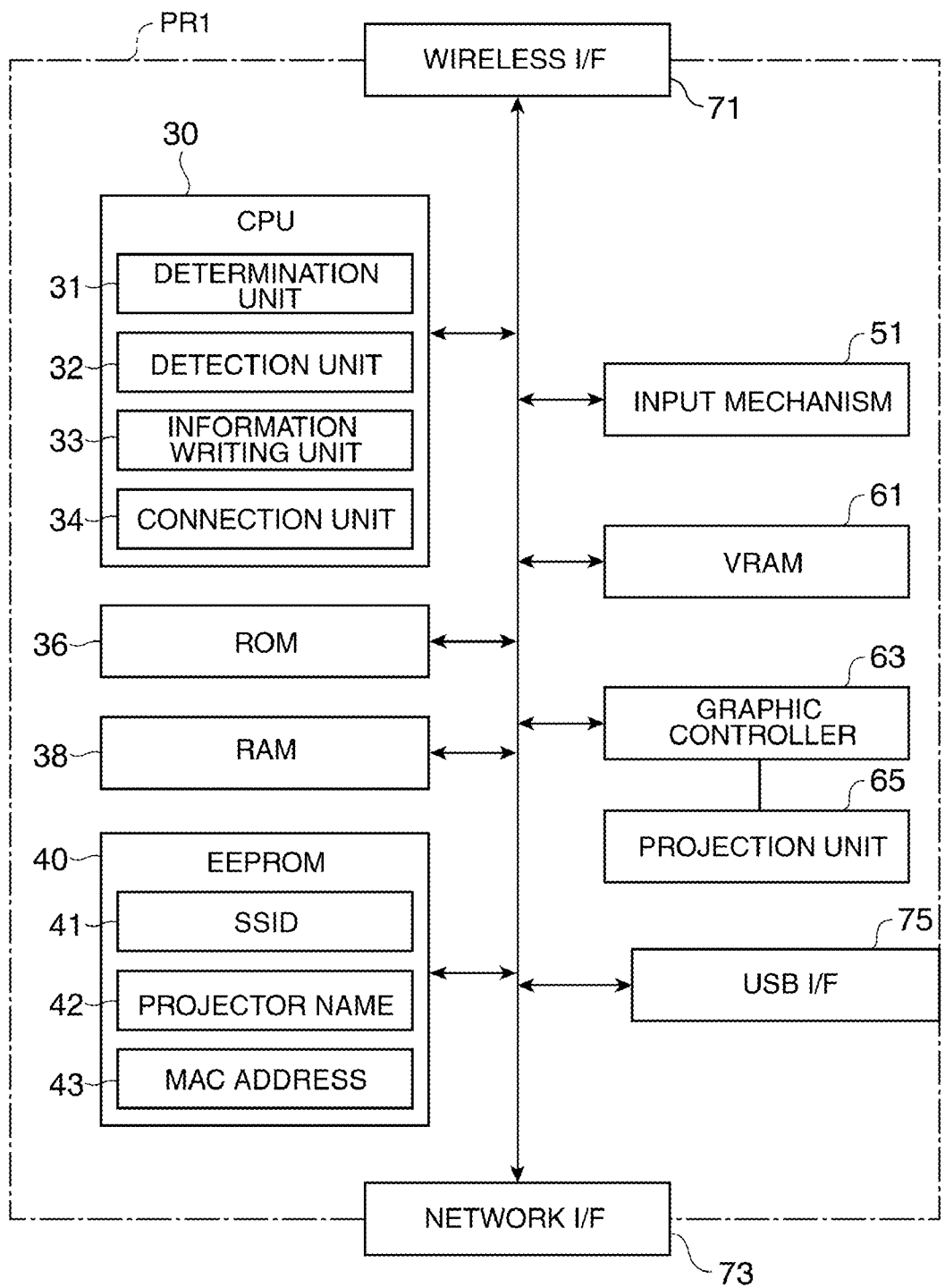
FIG. 2 is an explanatory diagram showing a schematic configuration of a projector PR1.

A schematic configuration of the projector PR1 included in the image display system 20 is shown in FIG. 2. Since the projector PR2 has the same configuration as the projector PR1, its explanation is omitted. As shown in the drawing, the projector PR1 includes a CPU 30, a ROM 36, a RAM 38, an EEPROM 40, an input mechanism 51, a VRAM 61, a graphic controller 63, a wireless interface 71, a network interface 73 and a USB interface 75, which are connected to one another by a bus.

The CPU 30 controls the whole function of the projector PR1 by opening programs stored in the ROM 36 in the RAM 38 and executing them, and functions as a determination unit 31, a detection unit 32, an information writing unit 33 and a connection unit 34. The details of the function units will be described later.

The EEPROM 40 is a non-volatile memory which can be rewritten, in which a SSID (Service Set Identifier) 41, a projector name 42 and a MAC address 43 as default values are stored when the projector PR1 is shipped. The input mechanism 51 includes a keyboard and a display as a UI.

The graphic controller 63 projects images on a projection unit 65 by using a VRAM 61 as a buffer. The projection unit 65 includes a liquid-crystal type projection mechanism, displaying images on the screen SC1 by projecting light transmitted through a liquid crystal panel for respective colors of RGB. The liquid-crystal type is used in the present embodiment, however, it is not limited to this type, and various types such as a CRT type, a DLP type, an LCOS type, and a GLV type can be used.

The wireless interface 71 is an interface for performing wireless communication in the ad-hoc mode, which is capable of performing a peer-to-peer connection with the computer PC1 or the computer PC2. The network interface 73 is an interface used when the projector PR1 is connected to a wired-method local area network. A USB interface 75 is a USB connector of the host side, to which the USB memory U1 can be connected.

A-3. Schematic Configuration of Computers PC1, PC2

Figure 3:
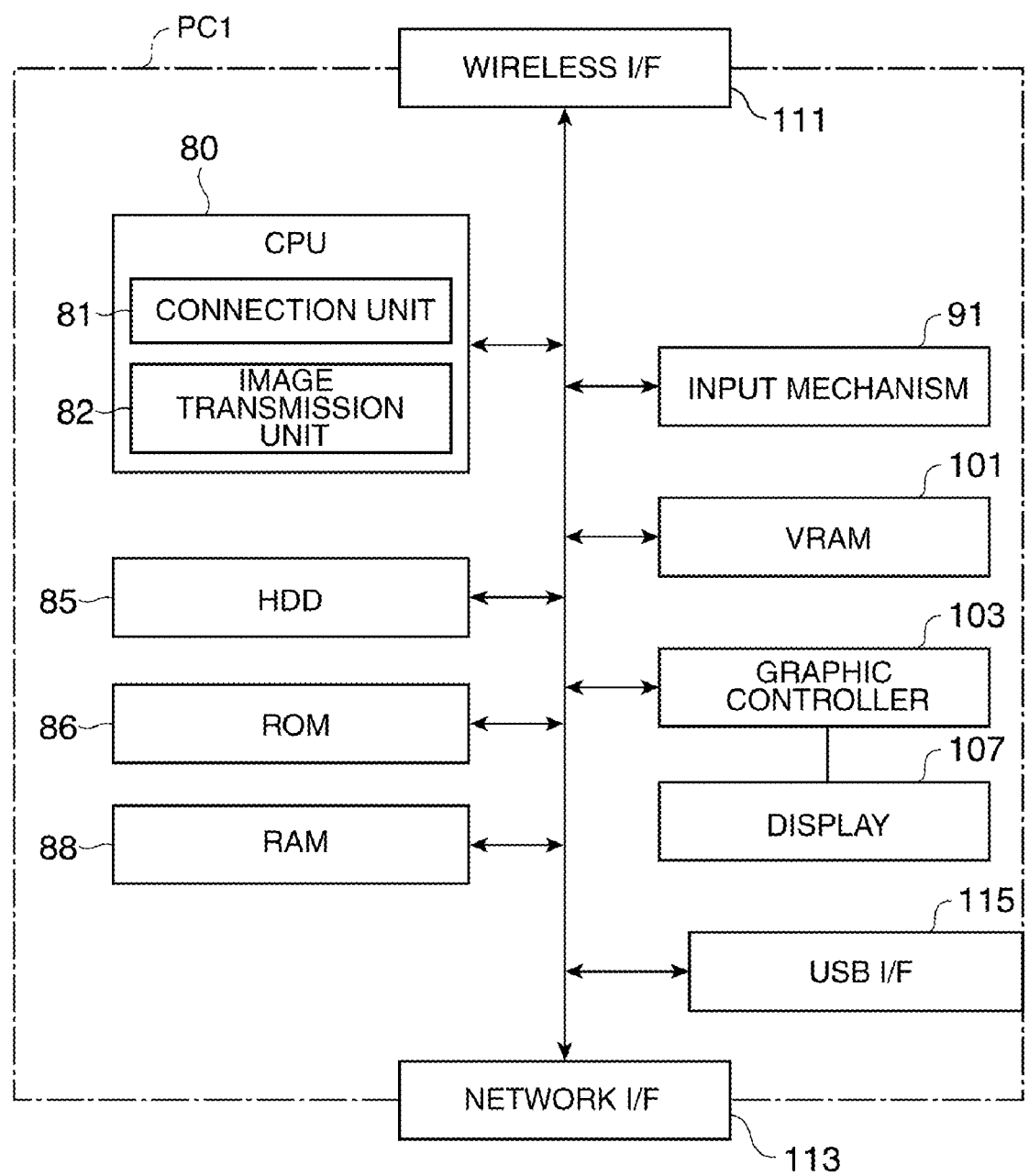
FIG. 3 is an explanatory diagram showing a schematic configuration of a computer PC1.

A schematic configuration of the computer PC1 included in the image display system 20 is shown in FIG. 3. Since the computer PC2 has the same configuration as the computer PC1, its explanation is omitted. As shown in the drawing, the computer PC1 includes a CPU 80, a hard disc drive 85, a ROM 86, a RAM 88, an input mechanism 91, a VRAM 101, a graphic controller 103, a display 107, a wireless interface 111, a network interface 113 and a USB interface 115, which are connected to one another by a bus.

The CPU 80 controls the computer PC1 by opening firmware and OS stored in the hard disc drive 85 and the ROM 86 in the RAM 88 and executing them. The CPU 80 also functions as a connection unit 81 and an image transmission unit 82 by executing programs stored in the hard disc drive 85. The details of the function units will be described later.

The input mechanism 91 includes a keyboard and a pointing device (a mouse, in this case). The graphic controller 103 displays images to be displayed on the display 107 by using the VRAM 101 as a buffer.

The wireless interface 111 is an interface for performing wireless communication in the ad-hoc mode, which is capable of performing peer-to-peer connection with the projectors PR1, PR2 or the computer PC2. The network interface 113 is an interface used when the computer PC1 is connected to a wired-method local area network. The USB interface 115 is a USB connector of the host side, to which the USB memory U1 can be connected.

A mechanism in which, when a CD-ROM is inserted into a not-shown CD-ROM drive, a prescribed script file on the CD-ROM is executed, that is, a so-called autorun function is provided in the computer PC1 as a standard.

A-4. Schematic Configuration of USB Memory U1

Figure 4:
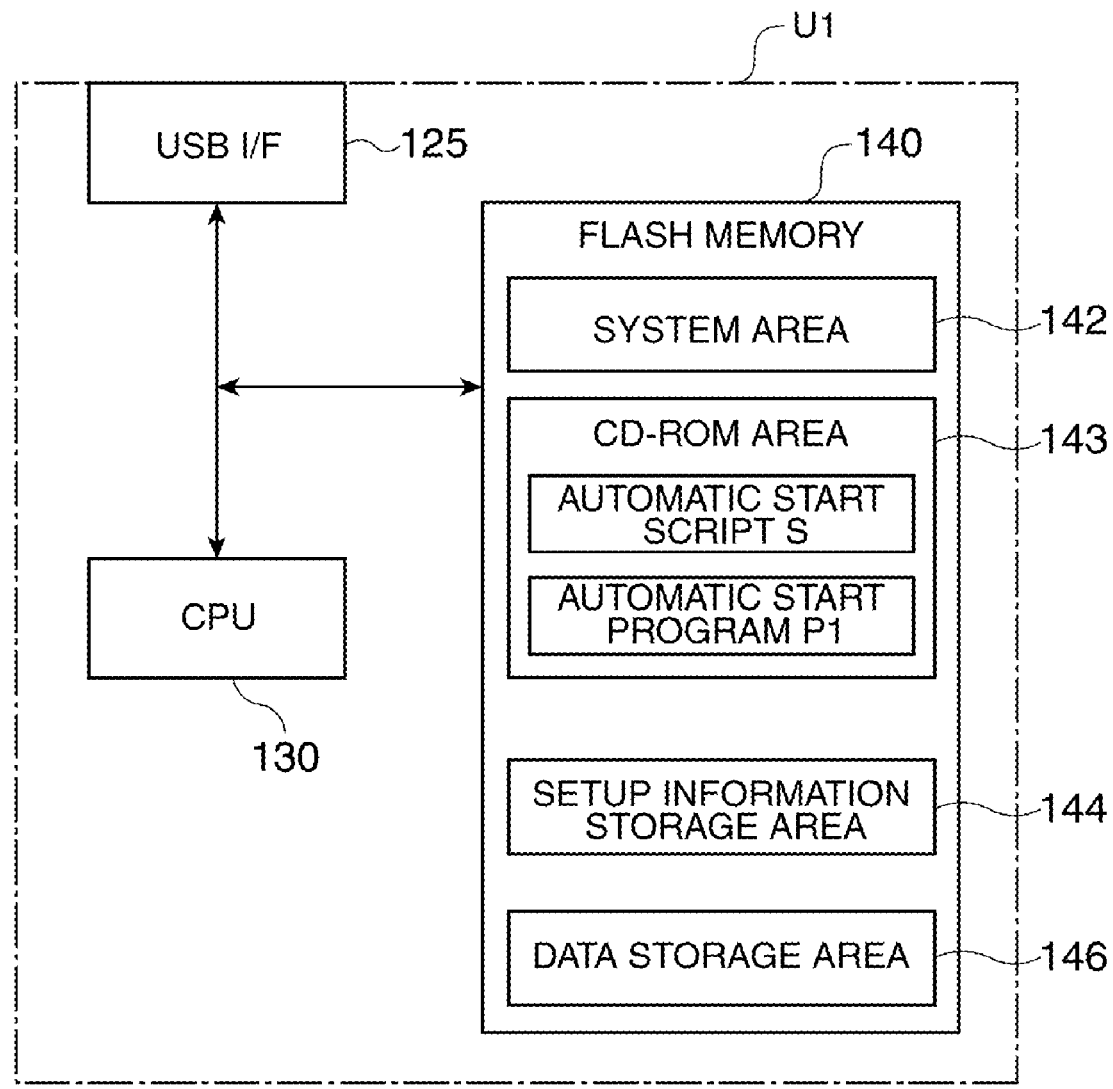
FIG. 4 is an explanatory diagram showing a schematic configuration of a USB memory U1.

The USB memory U1 included in the image display system 20 is a USB memory used for setup of network connection between the projector PR1 and the computer PC1, whose schematic configuration is shown in FIG. 4. Since the USB memory U2 has the same configuration as the USB memory U1, its explanation is omitted. As shown in the drawing, the USB memory U1 includes a USB interface 125, a CPU 130 and a flash memory 140, which are connected to one another by a bus.

The USB interface 125 is a USB connector of the device side, which can be connected to the USB interface 75 of the projector PR1 and the USB interface 115 of the computer PC1.

The flash memory 140 is a non-volatile memory which can be rewritten, including a system area 142, a CD-ROM area 143, a setup information storage area 144 and a data storage area 146. The system area 142 stores files concerning functional control of the USB memory U1 such as file system information and partition information, and identification information of the USB memory U1 such as a product ID and a vendor ID.

The CD-ROM area 143 stores an automatic start script S for allowing the CPU 80 of the computer PC1 to recognize that the CD-ROM is inserted when the USB memory U1 is connected to the USB interface 115 of the computer PC1 to perform automatic start. The CD-ROM area 143 stores an automatic start program P1. The automatic start program P1 is a program in which execution is designated in the automatic start script, and the details of which will be described later.

The setup information storage area 144 is an area storing information necessary for the network setup for establishing connection between the projector PR1 and the computer PC1 in the ad-hoc mode.

The data storage area 146 is an area which can store desired data files, for example, desired image files. Since the USB memory U1 includes this area, the USB memory U1 can be used as a common USB memory which stores desired files such as conference material, presentation material, in addition to the application for network connection which will be described later.

B. Connection/Projection Processing

Connection/projection processing in the image display system 20 is explained with reference to FIG. 5 and FIG. 6. The connection/projection processing is processing for establishing connection by performing network setup in the ad-hoc mode between the projector PR1 and the computer PC1 which are optionally selected by simple operation and for projecting images selected by the computer PC1 on the projector PR1. As shown in the drawing, the processing is started by a user connecting the USB memory U1 to the USB interface 75 of the projector PR1 (Operation O310).

When the USB memory U1 is connected, the CPU 30 of the projector PR1 determines whether the connected USB memory U1 is a prescribed USB memory for network setup or not (Step S210) as processing of the determination unit 31.

Specifically, the determination is made by determining whether a specific folder configuration exists in the flash memory 140 or not. For example, in the case that a "system" folder is formed for the system area 142 and a "GUID" folder exists under the folder, it is determined that the connected USB memory U1 is the prescribed USB memory for network setup. It is possible to make determination simply and positively by the above determination method.

The determination method of the USB memory is not limited to the above pattern but may be made by various methods such as a file configuration (including determination whether a specific file exists), identification information, a volume configuration and whether a specific name is given to a storage medium, in addition to the folder configuration. For example, when the "system" folder is formed for the system area 142 and an "AAA.dat" file exists in the system area 142, or when a prescribed product ID or a vendor ID exists in the system area 142, it can be determined that the connected USB memory U1 is a prescribed USB memory for network setup.

As a result, when it is determined that the connected USB memory U1 is the prescribed USB memory for network setup (YES: Step S210), the CPU 30 detects an available network as processing of the detection unit 32 (Step S220). In the embodiment, when it is determined that the connected USB memory U1 is the prescribed USB memory for network setup as the result (YES: Step S210), the CPU 30 detects an available network as processing of the detection unit 32 (Step S220). In the embodiment, the detection is performed based on whether a prescribed communication driver is installed in the projector PR1 or not, however, other methods can be used such as a configuration of detecting a network in which the communication driver is installed by actually performing communication with the network.

Then, the CPU 30 writes network setup information corresponding to the detected network in the setup information storage area 144 of the USB memory U1 as processing of the information writing unit 33 (Step S230, S320). In the embodiment, the wireless LAN network in the ad-hoc mode is detected as the available network in Step S220. Then, the CPU 30 writes the SSID 41, the projector name 42 and the MAC address 43 in the setup information storage area 144 by referring to the EEPROM 40 of the projector PR1 in Step S230. The projector name 42 is written by considering convenience of the user, which is not essential. The solid identification information for identifying the other party of communication is not limited to the projector name 42 or the MAC address 43, and may be identification information which is uniquely fixed, for example, an IP address and the like.

In the Step S220, when plural types of available networks are detected, it is preferable that a setup file which stores the order of priority of types of assumed networks is stored in the EEPROM 40 in advance, and network setup information corresponding to a network having the highest order of priority in the detected networks is written by referring to the setup file. In this way, even when there are plural available networks, accurate network setup information can be written without troubling the user. The above setup file may be the one which can be changed by the user as a matter of course.

As types of networks, the above various wired methods can be considered in addition to the wireless LAN. Additionally, the order of priority is not limited to the previous setting but, for example, it is preferable to apply a configuration in which types of the detected networks are displayed on the display of the input mechanism 51 and selection instruction by the user is received by the input mechanism 51 to write network setup information corresponding to the selected network.

On the other hand, when it is determined that the connected USB memory U1 is not the prescribed USB memory for network setup (NO: Step S210), connection/projection processing ends.

When the network setup information is written in the USB memory U1 as described above, the user removes the USB memory U1 from the USB interface 75 of the projector PR1 and connects the USB memory U1 to the USB interface 115 of the computer PC1 (operation O330).

When the USB memory U1 is connected, the CPU 80 of the computer PC1 automatically starts the automatic start program P1 of the USB memory U1 (Step S410). Specifically, the CPU 80 recognizes that the USB memory U1 is connected as the insertion of a CD-ROM by receiving a recognition control signal from the CPU 130 of the USB memory U1. Then, the CPU 80 executes the automatic start script S stored in the CD-ROM area 143 of the USB memory U1. Since execution of the automatic start program P1 is designated in the automatic start script S, the automatic start program P1 starts automatically by the connection of the USB memory U1. The automatic start program P1 is a program for executing processing of Step S420 to S440 which will be described later. In the embodiment, pseudo-recognition as the CD-ROM by the CPU 80 realizes the autorun function of the USB memory U1, however, it is not limited to this and some other methods corresponding to the autorun function included in the computer PCd may be applied.

When the automatic start program P1 starts automatically, the CPU 80 determines whether a setup/projection program P2 is installed in the computer PC1 for performing network setup necessary for connection between the computer PC1 and the projector PR1 and for projecting images by the projector PR1 based on the automatic start program P1 (Step S420). As a result, when the program P2 is not installed, it is impossible to perform the projection by the projector PR1 in the present state, therefore, the installation of the setup/projection program P2 is executed (Step S430).

On the other hand, when the setup/projection program P2 is installed in the computer PC1, it is not necessary to perform installation again, therefore, the process proceeds to Step S440 which will be described later.

After the installation of the setup/projection program P2 is executed, the CPU 80 starts the setup/projection program P2 (Step S440), performing network setup by storing network setup information stored in the setup information storage area 144 of the USB memory U1 in the hard disc drive 85 (Step S450). Then, the CPU 80 makes a connection request to the projector PR1 by the wireless interface 111 as processing of the connection unit 81 (Step S460).

On the other hand, the CPU 30 of the projector PR1 determines whether the connection request has been made from the computer PC1 or not as processing of the connection unit 34 (Step S240), after writing network setup information in Step S230. When a valid connection request is received (YES: Step S240), the CPU 30 performs connection permission as processing of the connection unit 34 (Step S250). In this way, connection relationship in the ad-hoc mode is established between the computer PC1 and the projector PR1.

When the connection is established, the CPU 80 of the computer PC1 transmits data D of images desired by the user (in this case, images displayed on the display 107 of the computer PC1) to the projector PR1 as processing of the image transmission unit 82 (Step S470).

Accordingly, when the image data D is transmitted, the projector PR1 receives the image data D and projects images of the image data D on the screen SC1 by using the projection unit 65 (Step S260). Accordingly, the connection/processing processing ends.

In the image display system 20 having the above configuration, the projector PR1 writes network setup information in the setup information storage area 144 of the USB memory U1 when the user connects the USB memory U1 to the USB interface 75 of the projector PR1. After that, when the user removes the USB memory U1 from the USB interface 75 and connects it to the USB interface 125 of the computer PC1, the computer PC1 performs network setup by referring to the network setup information. Therefore, the user can perform network setup between the computer PC1 and the projector PR1 easily to establish the connection and can display images based on image data received from the computer PC1. Since the USB memory is used as a storage medium, general versatility with respect to connection performance to various devices is high.

Additionally, in the image display system 20 having the above configuration, the projector PR1 determines whether the connected USB memory U1 is the prescribed USB memory for network setup, and writes network setup information in the setup information storage area 144 of the USB memory U1 only when it is determined that the connected USB memory U1 is the prescribed USB memory for network setup. Therefore, it is prevented that network setup information is accidentally written when the USB memory and the like storing image data of images which are desired to be projected by the projector are connected.

Also in the image display system 20 having the above configuration, the USB memory U1 has the autorun function, and the automatic start program P1 starts automatically when connected to the USB interface 125 of the computer PC1. When the automatic start program P1 is executed, whether the setup/projection program P2 which realizes the function of performing network setup and the function of displaying images on the projector PR1 has been installed in the computer PC1 or not is determined, and in the case that the installation has not been performed, installation is performed to realize the above functions. Therefore, even when images are displayed by the projector PR1 by using the computer PC1 for the first time, it is possible to perform network setup and image display simply without troubling the user.

Moreover, since the USB memory U1 includes the data storage area 146, it can be used for normal use applications such that image data to be projected by the projector PR1 is stored. Additionally, since the setup information storage area 144 and the data storage area 146 are managed separately in the flash memory 140, it is possible to manage stored image data and the like and network setup information correctly.

Second Embodiment

Next, a second embodiment of the invention will be explained. A projector PR3 used in the second embodiment has the same function as the projectors PR1, PR2 used in the first embodiment, however, differs from the first embodiment in a point that a function of a wired LAN is included. The projector PR3 is capable of performing communication in the infrastructure mode in accordance with a so-called 10BASE-T standard in the wired LAN, in addition to the communication in the ad-hoc mode through the wireless LAN explained in the first embodiment. In this case, the projector PR3 has an IP address and can communicate with another device also having an IP address by a TCP/IP protocol to exchange various information. The projector PR3 and a computer PC3 are connected to a network NT3 through the network I/F 73, 113 shown in FIG. 2 and FIG. 3.

Figure 7:
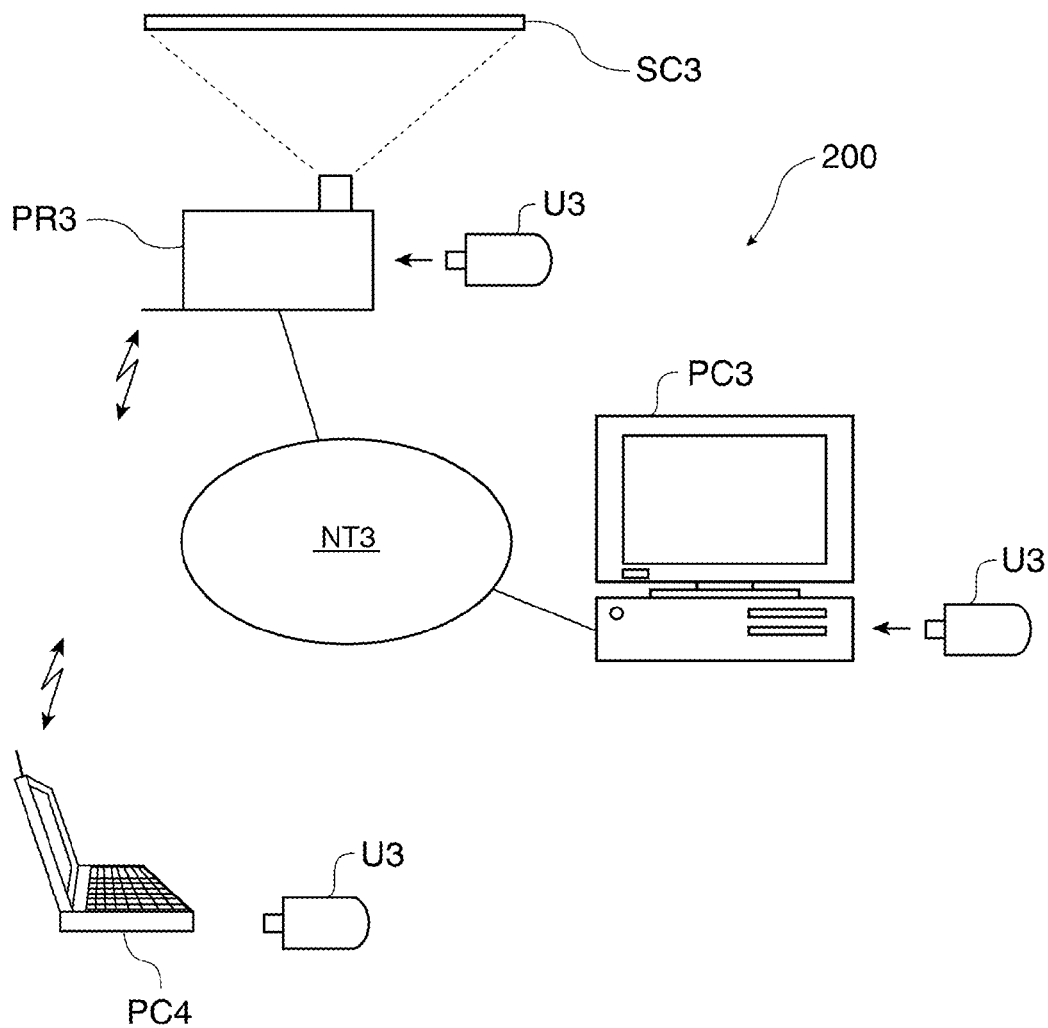
FIG. 7 is a system configuration view of a second embodiment.

FIG. 7 is a schematic configuration view of an image display system 200 according to the second embodiment. The system 200 includes the projector PR3 as the image display device described above, the computer PC3 as another device connected to the network NT3 by the wired LAN, a notebook computer PC4 connected to the projector by the wireless LAN and the like. Each of the projector PR3, the computer PC3 and the notebook computer PC4 has a USB port, in which Windows-system OS operates. Therefore, when a CD-ROM or the USB memory including a partition in accordance with a standard of the CD-ROM is attached, the computer PC3 and the notebook computer PC4 can automatically execute start items stored in the CD-ROM or the USB memory. In the embodiment, a dedicated USB memory U3 which stores a file of a specific name previously fixed as identification information is used. The partition regarded as the CD-ROM is formed inside, in which a specific program automatically started at the time of recognition is stored. The internal configuration of the USB memory U3 is the same as the USB memory in the first embodiment.

Figure 8:
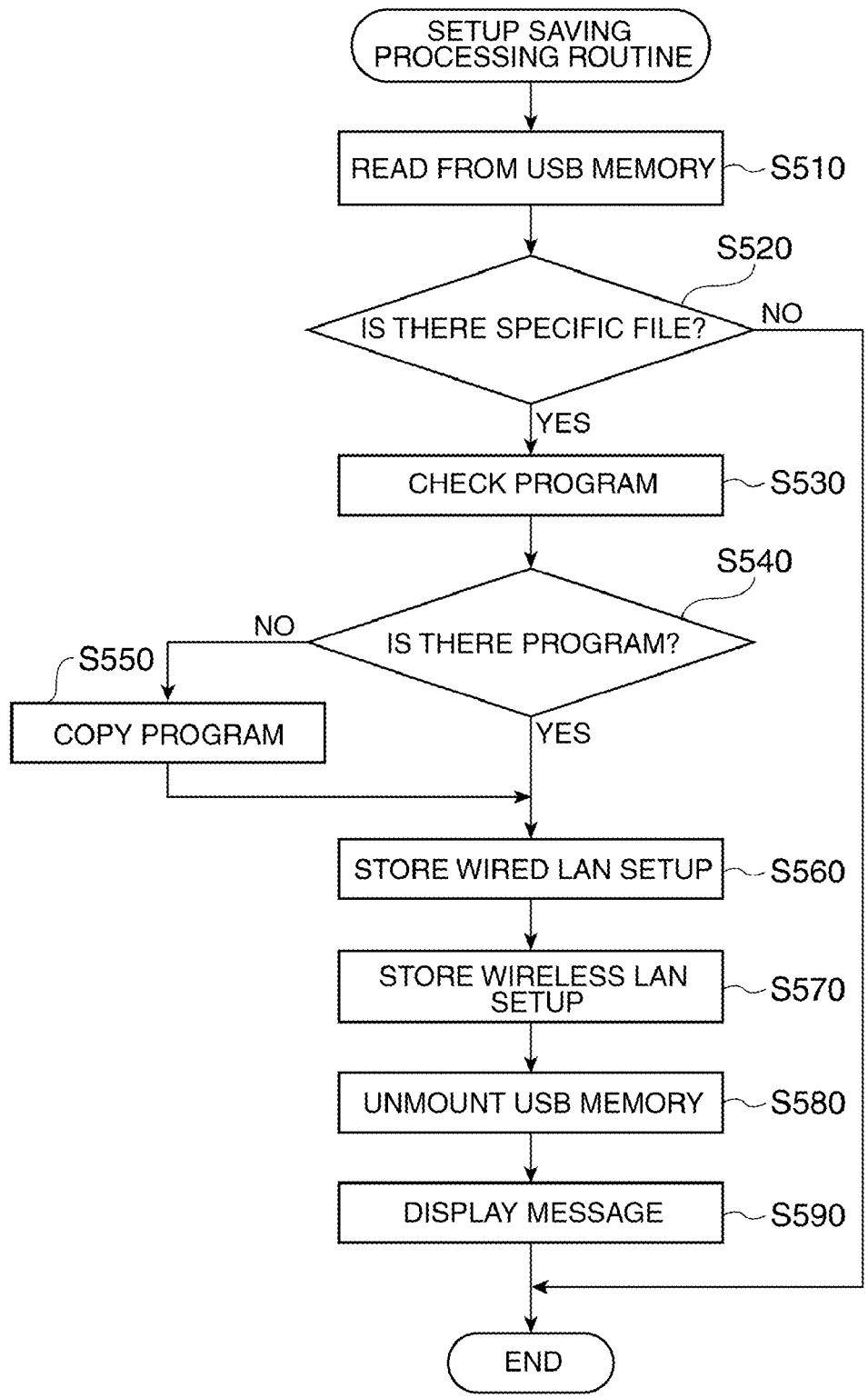
FIG. 8 is a flowchart showing processing in a projector PR3 according to the second embodiment.

Next, processing performed by the projector PR3 when the USB memory is attached to a USB port will be explained. FIG. 8 is a flowchart showing a setup saving processing routine executed by the projector PR3 when the USB memory is attached to the USB port. The processing is executed after the USB memory is attached to the USB port and the USB memory is mounted by the function of OS. When the processing is started, the CPU (numeral 30, FIG. 2) of the projector PR3 performs processing of reading a file having a specific file name from the USB memory (Step S510) and determines whether there exists the file having the specific file name or not (Step S520). The file having the specific file name exists when the USB memory is the dedicated USB memory U3, therefore, the projector PR3 succeeds in reading the file and determines that there exists the file. This corresponds to the determination whether the USB memory has specific identification information or not. It is also preferable, as a matter of course, to determine whether the USB memory is the dedicated USB memory U3 or not by embedding prescribed identification information of a specific area other than the file system, instead of the processing of determining the existence of the file having the specific file name.

When the attached USB memory is not the dedicated USB memory U3, no processing is done and the process shown in FIG. 8 ends. On the other hand, when it is determined that the attached USB memory is the dedicated USB memory U3, subsequently, whether a specific program is stored in the USB memory U3 or not is checked (Step S530). The specific program is a program which will be necessary when the USB memory U3 is attached to the computers PC3, PC4 and the like after the USB memory U3 is attached to the projector PR3. Hereinafter, the program is referred to as an "image display setup program". Whether there exists the image display setup program or not is determined (Step S540), and when the image display setup program does not exist, processing of copying the image display setup program stored in the ROM 36 in the projector PR3 to the dedicated USB memory U3 is performed (Step S550).

After that, the projector PR3 writes information concerning setup of the wired LAN of itself in the dedicated USB memory U3 as a file (Step S560), and further, writes information concerning setup of the wireless LAN of itself in the dedicated USB memory U3 as another file (Step S570). Information written in the dedicated USB memory U3 is shown in FIG. 9A and FIG. 9B. In the example, setup information concerning the wired LAN is saved as a file name "ManualStart" as shown in FIG. 9A. On the other hand, setup information concerning the wireless LAN is saved as a file name "FastStart" as shown in FIG. 9B. The former stores an IP address, a projector name and a MAC address as setup information for communication in the wired LAN. The latter stores a SSID, a projector name and a MAC address as setup information for communication in the wireless LAN.

After the above processing, the projector PR3 performs processing of unmounting the USB memory U3 and allowing the USB memory U3 to be removable (Step S580). Generally, in the OS which applies a management system managing files by using a file allocation table and the like, the device is managed in the mounted state, and a discretionary removal of the device by the user is prohibited while performing reading and writing of data by the file management system for maintaining consistency of the contents stored in the storage device. Accordingly, when the dedicated USB memory U3 is attached, the state in which the user can physically remove the USB memory U3 from the projector PR3 at any time is kept by unmounting the USB memory U3 immediately after the storage of necessary information (Step S560, S570) is completed.

After the above processing is performed, the projector PR3 displays a message (Step S590), escaping to "NEXT" to end the present processing routine. In the embodiment, the projector PR3 displays a message which says "Remove the USB memory U3 and attach the memory to a computer which is going to display images". Accordingly, the timing when the removal of the USB memory U3 is permissible can be easily known, and further, a next action is promoted, therefore, effective setup work can be performed. The message can be displayed just as the presentation of information, merely saying "Necessary setup information has been stored". It is also preferable that the message is projected on a screen SC3 from the projector PR3, or that the message is displayed on a display such as a liquid-crystal panel provided at an operation panel of the projector PR3. As a matter of course, such display is not always necessary.

The user removes the USB memory U3 from the USB port in accordance with the message and attaches it to the USB port of the computer PC3 or the notebook computer PC4. At this time, as a function of OS mounted on the computer PC3, first, processing of determining the type of device attached to the USB port and mounting the device is performed. When the device is mounted, the area partitioned at part of the USB memory U3 is recognized as the CD-ROM including an automatic execution program, therefore, a program having the specific name (for example, autoexec.bat) stored in the area is automatically started. The processing by the automatic execution program is shown in a flowchart of FIG. 10.

Figure 10:
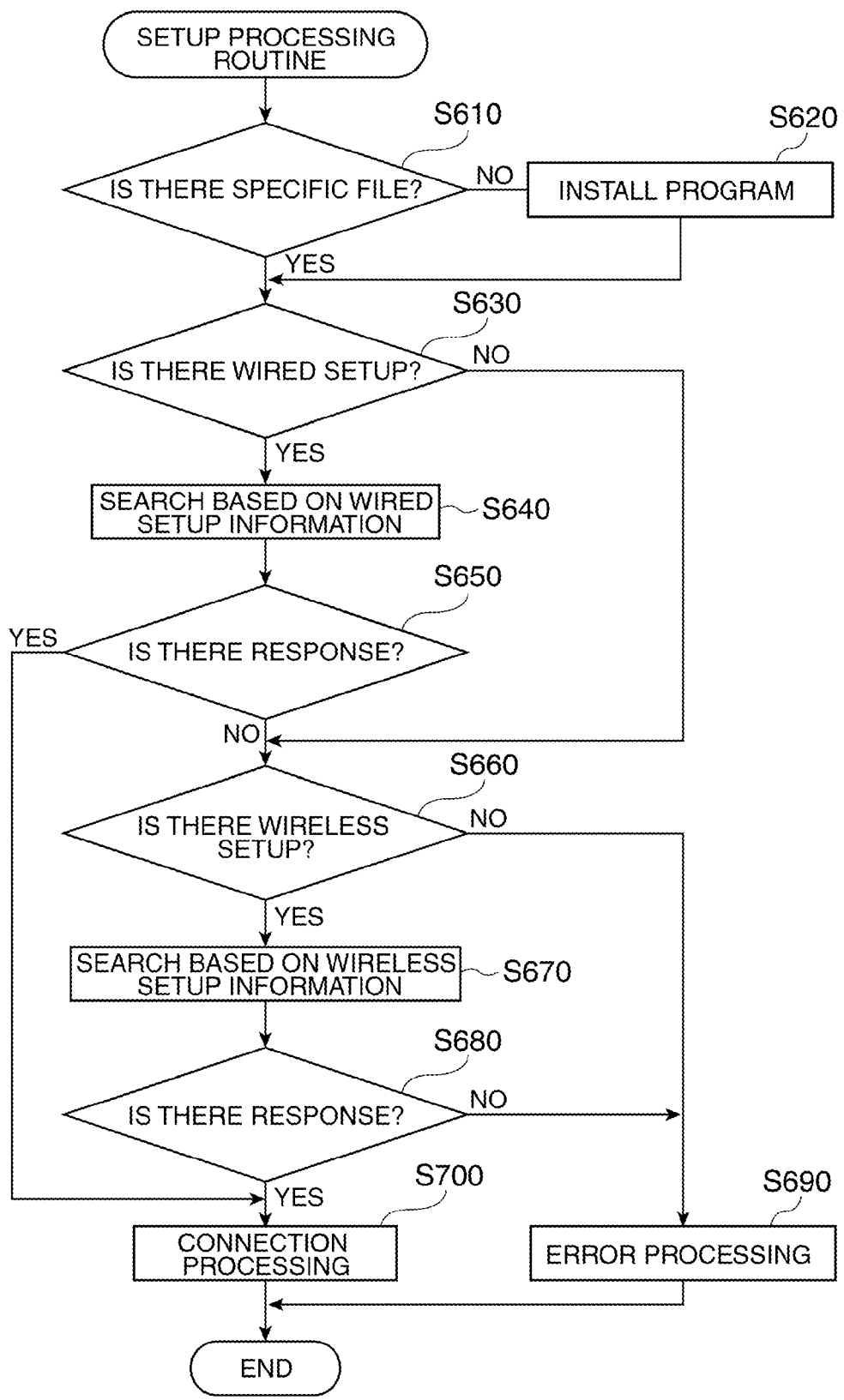
FIG. 10 is a flowchart showing setup processing executed by a computer PC3 in the second embodiment.

When the processing shown in FIG. 10 is started, the CPU (numeral 80, FIG. 3) of the computer PC4, first, determines whether the program to be executed now is already stored in the computer PC4 or not (Step S610). The program to be executed includes a specific registry, which is stored in a specific folder as a prescribed program name. Therefore, it is easy to determine whether there exists the program or not. The program is the above-mentioned "image display setup program".

When the image display setup program does not exist, the CPU 80 performs processing of copying the image display setup program stored in the USB memory U3 attached to the USB port in the computer PC3 and installing the program so as to be available (Step S620). After the above processing, the CPU 80 gives processing of itself to the installed image display setup program (after Step S630 in FIG. 10), however, the processing of these is shown in FIG. 10 as a series of processing.

When the image display setup program (after Step S630) is started, first, whether setup information of the wired LAN is stored in the USB memory U3 or not is determined (Step S630), and when the information is stored, processing of reading setup information and searching the other party of communication based on the setup information is performed (Step S640). Specifically, in order to perform communication in the wired LAN in the infrastructure mode, a packet to which the IP address (refer to FIG. 9A) included in setup information is added is sent to the network NT 3 to request a response.

Subsequently, whether there is a response from the projector PR3 to be the other party for image display or not is determined (Step S650), and when there is the response, the process proceeds to Step S700 and connection to the projector PR3 is performed. The connection processing will be described later. On the other hand, when the response is not obtained by the search based on setup information of the wired LAN, or when it is determined that setup information of the wired LAN is not stored in the USB memory U3 in Step S630, the CPU 80 of the computer PC determines whether setup information of the wireless LAN is stored in the USB memory U3 or not (Step S660). When the setup information of the wireless LAN is stored, processing of reading the setup information and searching the other party of communication based on the setup information is performed (Step S670). Specifically, in order to perform communication in the wireless LAN in the ad-hoc mode, a packet to which the SSID (refer to FIG. 9B) included in setup information is added is sent to request a response.

Subsequently, whether there is a response from the projector PR3 to be the other party for image display is determined (Step S680), and when there is the response, the process proceeds to Step S700 and the connection to the projector PR3 is performed. When there is not the response, or when it is determined that setup information of the wireless LAN is not stored in Step S660, it is impossible to perform setup for image display by the USB memory U3 attached to the USB port, therefore, error processing (Step S690) is performed. The error processing is processing of displaying a message which says "Setup failed. Start setup from attaching the USB memory to the projector once again." on a screen of the computer PC and unmounting the USB memory U3. As a matter of course, it is preferable to inform the generation of an error by voice or beep sound.

Figure 11:
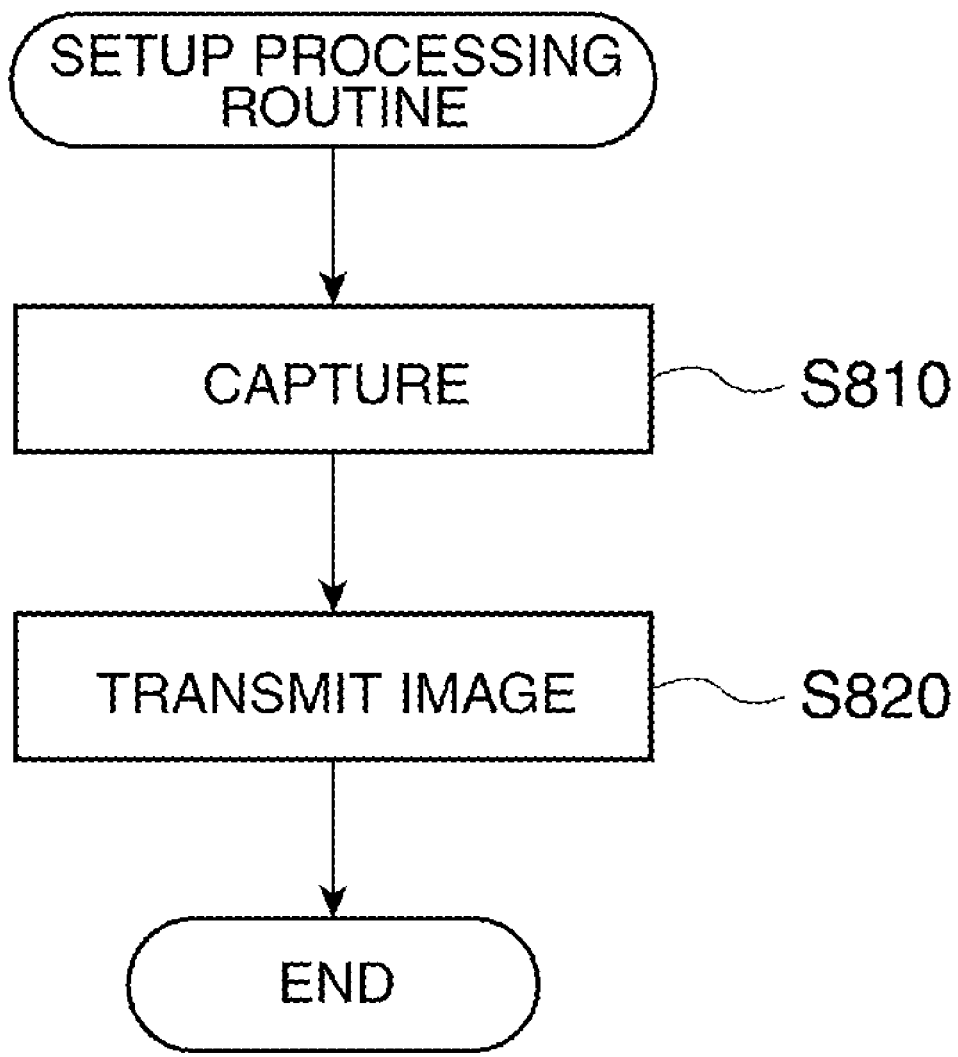
FIG. 11 is a flowchart showing processing for display to be resident in the computer PC3 and executed repeatedly in the second embodiment.

When the projector PR3 normally responds by the setup of communication in the wired LAN or the wireless LAN, it is determined that the searching succeeded (Step S650 or S680) and connection processing to the projector PR3 is performed (Step S700). The connection processing is started by installing a program shown in FIG. 11 in the computer PC3. The program shown in FIG. 11 is a resident program, which is started repeatedly approximately every 30 msec by using an internal timer. Continuously, the image display program shown in FIG. 11 will be explained.

The image display program shown in FIG. 11 is started approximately every 30 msec when installed, and first, performs processing of capturing an image displayed on the display of the computer PC3 at that time (Step S810). The capture of the screen is performed by using standard functions such as Windows (trademark). It is preferable that the capture of the screen is performed with respect to the whole screen of the display 107 of the computer PC3, or with respect to a window managed by a specific application program (for example, an application program which is active at present). As a matter of course, it is also possible to capture only the display of a window managed by an application program executed at the background when the application program can be specified.

Subsequently, processing of transmitting the captured image to the projector PR3 is performed (Step S820). The transmission of the image is performed by the infrastructure mode when connected by the wired LAN and is performed by the ad-hoc mode when connected by the wireless LAN, respectively. The projector PR3 projects the image received through the wired or wireless LAN.

The second embodiment has been explained as the above. In the image display system 200 according to the embodiment, information necessary for setup is stored according to the type of communication function included in the projector PR3. Specifically, setup information of the wired LAN and the wireless LAN is both stored in the USB memory U3, and whether communication is possible or not is searched in the side of the computer PC3 by using setup information in the order from the wired LAN to the wireless LAN. Therefore, it is possible to easily configure the image display system when performing connection by either method. Additionally, since the wired LAN is preferentially used to perform setup when it can be used, image display by the projector PR3 can be performed rapidly and positively. Further, in the embodiment, if there is not the image display setup program in the USB memory U3 when the USB memory U3 is attached to the projector PR3, the program is copied from the projector PR3 to the USB memory U3 to be installed, therefore, it is possible to perform setup to the computer PC3 even when the image display setup program is not stored in the USB memory U3.

Furthermore, in the case that a necessary program is not installed in the computer PC3 or the notebook computer PC4 which makes the projector PR3 perform image display, the program is automatically loaded into the computer side from the USB memory U3, therefore, it is possible to save the user's trouble of installing programs each time. Though the image display setup program is installed in the computers side to be executed in the present embodiment, it is also preferable that the program is directly loaded from the USB memory U3 into a main storage of the computer to be executed. Also, in the embodiment, the method in which a screen or a window is captured and transmitted to the projector PR at a prescribed interval is applied for the transmission of images from the computer, therefore, the images displayed on the display of the computer can be displayed by the projector PR3 not depending on the application program executed by the computer. As a matter of course, it is also possible to display images by the projector PR3 in conjunction with a program created in accordance with an API fixed for image display.

Though the interval of capture is approximately 30 msec in the embodiment, it is possible to comply with the request of normal image display when approximately over ten images can be transmitted in a second. Needless to say, it is possible to further shorten the interval of capture and perform transmission in a state in which moving images and the like can be displayed smoothly. It is also possible to change the interval between capture and transmission in the case of connection by the wired LAN and the case of connection by the wireless LAN. Generally, images can be updated at high speed by the wired LAN as the band is wider in the wired LAN, however, it is preferable that the bandwidth after connection is measured and the number of images to be transmitted in a second and the interval of transmission are determined according to the transmission ability both in the wired LAN and the wireless LAN.

MODIFICATION EXAMPLES

Modification examples of the above embodiments will be explained.

C-1. Modification Example 1

In the first embodiment, the configuration of performing network connection in the ad-hoc mode using the wireless LAN is shown, however, the connection state is not limited to this. For example, it is also possible to perform connection in the infrastructure mode using the wireless LAN. In this case, the connection processing which is the same as the embodiment may be performed after performing network setup of the access point, the computer PC1 and the projector PR1. It is also preferable that connection processing is performed after performing network setup such as the IP address by using only the wired LAN.

In the above cases, as network setup information to be written in Step S230 of the first embodiment, for example, an identifier which can be uniquely identified such as an IP address, a projector name and the like of the projector PR1 can be used. In this way, it is not necessary to designate the projector PR1 to be connected on the computer PC1. Therefore, it is possible to simplify the operation for entry-level users.

C-2. Modification Example 2

It is not necessary to provide all respective processes in the first and second embodiments, and unnecessary processes can be omitted according to need. For example, the processing of Step S210 or S220 shown in FIG. 5 or the processing of Step S510 shown in FIG. 8 can be omitted. When both of Step S210, S220 or Step S510 is omitted, a configuration in which an instruction of writing permission is received from the user before executing the processing of S230 or a configuration in which an instruction of network setup permission is received from the user before the operation O310 can be applied. In this way, it is prevented that network setup information is accidentally written in the USB memory which stores image files and the like as in the embodiment.

Figure 5:
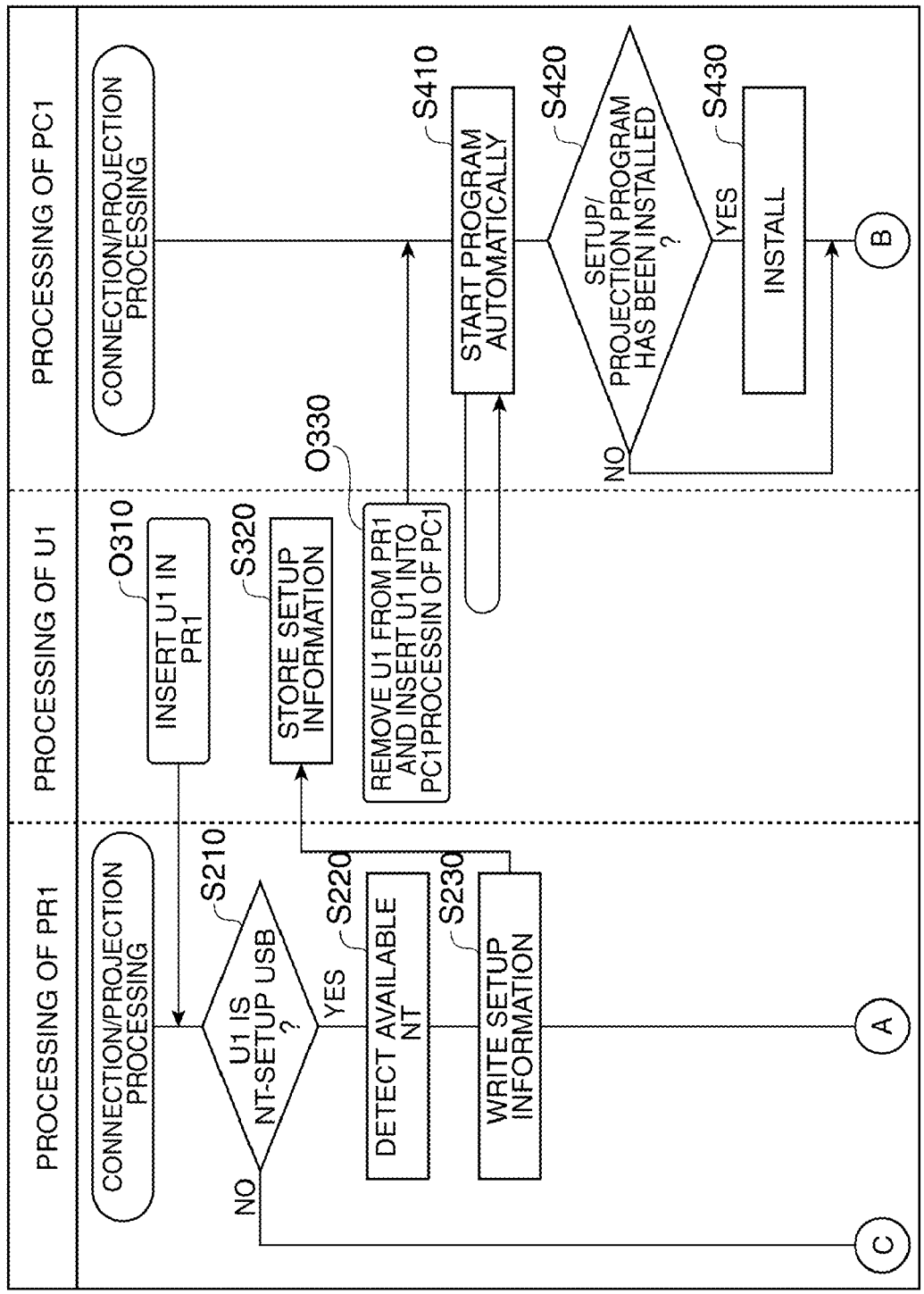
FIG. 5 is an explanatory chart showing the flow of connecting processing.
Figure 6:
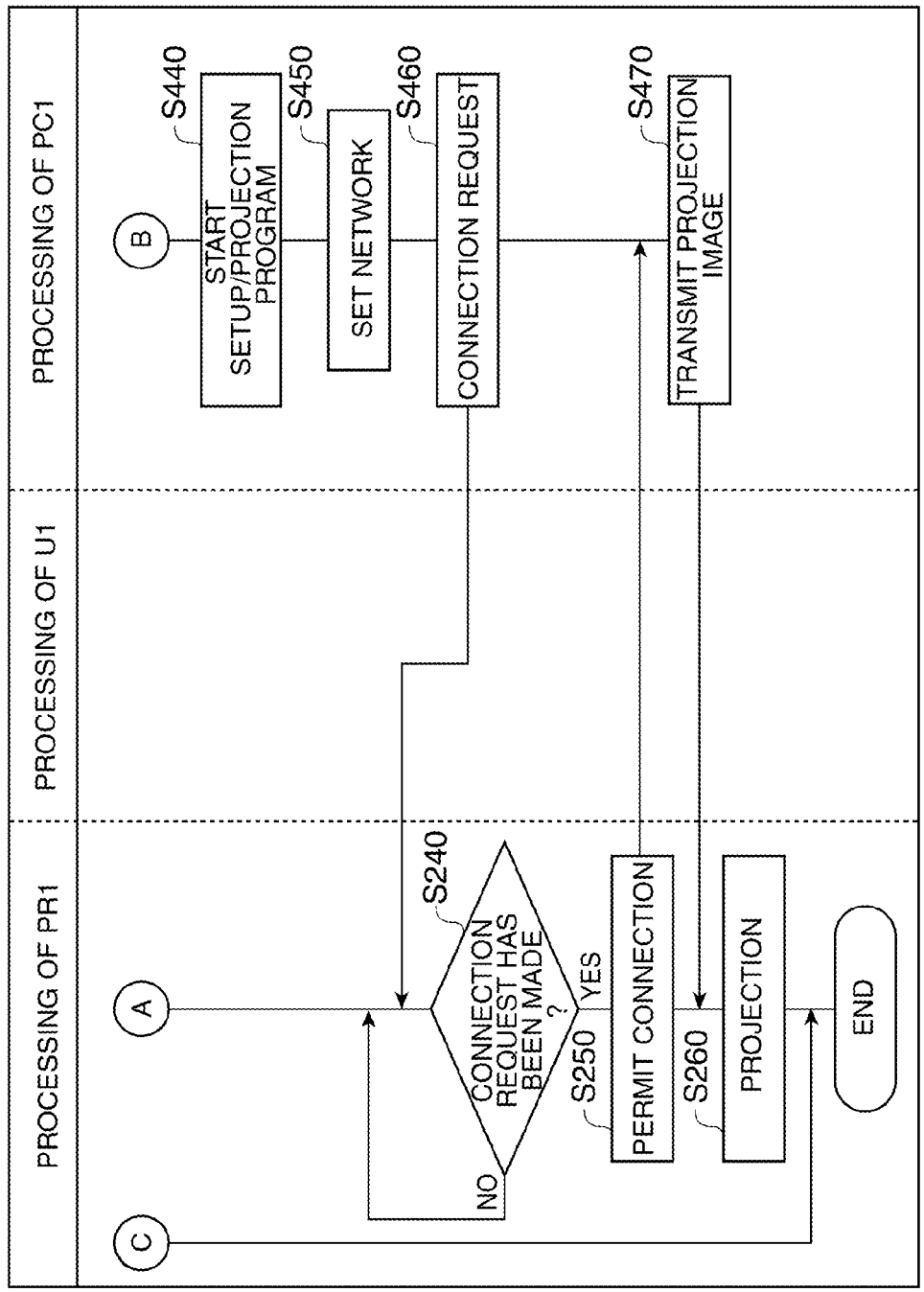
FIG. 6 is an explanatory chart showing the flow of connecting processing.

Additionally, S410 to S440 shown in FIG. 5 and FIG. 6, and Step S610 and S620 shown in FIG. 10 can be also omitted in the same manner. According to the above, though the user have to perform startup or installation of the program manually, it is possible to perform connection/projection processing shown in the embodiment by using a general-purpose USB memory. Additionally, a configuration in which part of processing of S410 to S440 is omitted can be applied. For example, a configuration in which only Step S440 is omitted and the setup/projection program P2 is started by manual operation by the user can be applied. In the case that the setup/configuration program P2 can be directly executed on the storage medium, Step S420 and Step S430 can be omitted.

C-3. Modification Example 3

In the first embodiment, the configuration in which only the information necessary for network setup is written as network setup information in Step S230 shown in FIG. 5 is shown, however, it is not limited to the configuration, and a configuration in which additional information is also written and obtained information is set to the computer PC1 can be applied. For example, a WEP key used for encryption of communication data may be written as additional information. In this way, further efficient setup can be realized.

C-4. Modification Example 4

In the first embodiment, the USB memory including the flash memory is used as the storage medium which performs exchange of network setup information between the projector PR1 and the computer PC1, however, it is not limited to the configuration and various storage media can be used. For example, various storage media such as a flexible disc drive, a CD-ROM drive, a DVD-ROM drive, a magneto-optic disc drive, a hard disc drive having the USB connector can be used instead of the above USB memory. Also in this way, high versatility can be obtained. It goes without saying that the connection method is not limited to the USB connector, and for example, a connection can be performed by inserting a PC card, a SD card, a compact flash card and the like into dedicated slots.

C-5. Modification Example 5

In the first embodiment, the projector PR1 including programs which can execute processing of Step S210 to S230 shown in FIG. 5 is shown, however, it is possible to apply a configuration in which these programs are previously stored in the USB memory U1 and installed in the projector PR1 by automatic start in the same manner as Step S410. In this way, it is possible to perform connection/projection processing shown in the embodiment by using a general-purpose projector.

C-6. Modification Example 6

In the second embodiment, the transmission of images is performed by capturing a screen of the computer PC and transmitting images at a prescribed interval, however, it is preferable to apply a configuration in which whether the dedicated USB memory U3 is attached to the USB port or not is determined before the processing of Step S810 of FIG. 11, and when the dedicated USB memory U3 is attached, capturing and transmission of the screen (Step S810, S820) are performed, and when the dedicated USB memory is not attached, the program which executes the image display routine shown in FIG. 11 is ended. At this time, in the case that it is the resident program, the program may be also deleted from the registry and the like and resident may be cancelled, in addition to the end of the processing of the program. In the case of the application of the configuration, images can be transmitted from the computer to the projector PR3 only while the dedicated USB memory U3 is attached to the USB port. When such configuration is applied, it is desirable that the USB memory U3 is unmounted on the file management system at the time when installation of the program in FIG. 10 (Step S620) ends. That is because the USB memory U3 can be removed from the USB port at any time as long as it is unmounted. It is possible to determine whether the USB memory U3 is attached to the USB port or not by reading the state of the USB port even in the unmounted state.

What is claimed is:

1. An image display device which can be connected to a network, comprising:
   a network connection unit performing communication through the network;
   a USB connection unit to which a USB memory can be connected;
   a detection unit detecting types of available networks when the USB memory is connected to the USB connection unit;
   a writing unit writing setup information necessary for setup of communication with the image display device through the network in the USB memory connected to the USB connection unit so as to be readable from another device which is different from the image display device, the writing unit writing the setup information corresponding to a type of network to be preferentially used based on a detection result by the detection unit; and
   a display unit displaying images by receiving given image data from the another device which is allowed to perform communication through the network by reading the setup information and performing setup concerning the network when the USB memory removed from the image display device is connected to the another device after the setup information is written.

2. The image display device according to claim 1, further comprising:
   a determination unit determining whether the connected USB memory is a dedicated storage medium in which setup information concerning the network is written, and
   wherein the writing unit writes the setup information when the determination unit determines that the connected USB memory is the dedicated storage medium.

3. The image display device according to claim 2,
   wherein the determination unit makes the determination based on a folder configuration or a file configuration stored in a storage area included in the USB memory or identification information stored in the USB memory.

4. The image display device according to claim 2, further comprising:
   a program writing unit writing a program in the USB memory when the USB memory does not include a program for reading the setup information by the another device from the USB memory.

5. The image display device according to claim 3,
   wherein the program writing unit is a unit writing the program so as to be automatically executed when the USB memory is connected to the another display device.

6. The image display device according to claim 1,
   wherein a wireless-LAN type and a wired-LAN type are included in the types of networks.

7. The image display device according to claim 6,
   wherein, when the image display device includes setup information concerning the wireless LAN and the wired LAN, the writing unit writes both setup information in the USB memory.

8. The image display device according to claim 1,
   wherein the image display device is a network-type projector, and
   wherein the display unit is a unit projecting images on a given projection screen.

9. A USB memory connected to a USB which is a general-purpose data bus, comprising:
   a unit storing setup information in a prescribed area, which is necessary for setup of communication with an image display device through a network, when connected to the image display device connected to the network and performing image display, the setup information corresponding to a type of network to be preferentially used based on a detection result by a detection unit of the image display device, the detection result being obtained by detecting types of available networks when the USB memory is connected to a USB connection unit of the image display device;
   a unit automatically starting a first program stored in advance when connected to another device which makes the image display device display images; and
   a unit executing a second program in the another device, which makes the image display device display images from the another device, after performing setup concerning the network in the another device so that the another device can be connected to the image display device by using the setup information stored in the storage area by the first program.

10. The USB memory according to claim 9,
    wherein the first program includes a program of determining whether the second program is installed in the another device, and when the second program is not installed, allowing the another device to carry out functions of executing installation of the second program and starting the installed second program.

11. An image display system, comprising:
    an image display device connected to a network;

another device which is different from the image display device; and a USB memory including prescribed identification information, and wherein the image display device includes:
- a network connection unit connecting to the network so that communication is possible,
- a USB connection unit to which the USB memory is connected so as to be detachable,
- a detection unit detecting types of available networks when the USB memory is connected to the USB connection unit,
- a writing unit writing setup information which is necessary for setup of communication with the image display device through the network when it is determined that the USB memory connected to the USB connection unit has the prescribed identification information, the writing unit writing the setup information corresponding to a type of network to be preferentially used based on a detection result by the detection unit, and
- a display unit displaying images by receiving given image data from the another device, and wherein the another device includes:
- a general-purpose USB connection unit to which a general-purpose USB memory can be connected,
- a network setup unit performing setup for enabling communication with the image display device through the network by using the setup information stored in the USB memory when the USB memory in which the setup information is written is connected to the general-purpose USB connection unit, and
- a transmission unit transmitting the given image data to the image display device through the network the setup of which is performed.

12. The image display system according to claim 11, wherein the USB memory includes a unit executing a prescribed program in the another device when the USB memory is connected to the another device, determining whether there exists a program realizing the network setup unit in the another device and installing the program from the USB memory so as to be executed in the another device when there does not exist the program.

13. The image display system according to claim 11 or 12, wherein the transmission unit in the another device captures an image displayed on a display unit included in the another device at a predetermined interval and transmits the captured images to the image display device.

14. A network setup method performing setup of communication between an image display device connected to a network and another device which is different from the image display device, comprising the steps of:
- connecting a USB memory having prescribed identification information to a USB port of the image display device;
- detecting types of available networks when the USB memory is connected to the USB connection unit;
- storing setup information necessary for setup of communication with the image display device through the network in the USB memory when the USB memory connected to the USB port includes the identification information, the setup information corresponding to a type of network to be preferentially used based on a detection result by the detection unit; and
- performing setup processing to enable communication between the another device and the image display device through the network by performing setup in the another device, which uses the setup information stored in the USB memory when the USB memory storing the setup information is connected to the another device.

15. The network setup method according to claim 14, further comprising the steps of:
- determining whether there exists a program performing the setup processing in the another device when the USB memory is connected to the another device; and
- installing the program in the another device when it is determined that the program does not exist.

* * * * *